United States Patent [19]

Masuoka

[11] 4,003,637
[45] Jan. 18, 1977

[54] FOCUSING SCREEN FOR REFLEX CAMERAS HAVING INTEGRAL RANGE FINDER MEANS

[75] Inventor: Seiichi Masuoka, Tokyo, Japan

[73] Assignee: A. I. C. Photo, Inc., Carle Place, N.Y.

[22] Filed: June 11, 1975

[21] Appl. No.: 586,142

[30] Foreign Application Priority Data

Oct. 23, 1974 Japan ............... 49-122264

[52] U.S. Cl. ..................... 350/286; 354/200
[51] Int. Cl.² ................ G02B 5/04; G03B 13/28
[58] Field of Search ......... 350/286, 167; 356/19; 354/199, 200, 201, 219, 161, 162, 163, 166

[56] References Cited

UNITED STATES PATENTS

| | | | |
|---|---|---|---|
| 2,669,916 | 2/1954 | Dodin | 350/286 |
| 2,986,599 | 5/1961 | Lindner et al. | 354/199 |
| 3,149,547 | 9/1964 | Jurenz | 354/199 |
| 3,233,533 | 2/1966 | Sauer | 354/201 |

FOREIGN PATENTS OR APPLICATIONS

| | | | |
|---|---|---|---|
| 1,157,316 | 5/1958 | France | 354/166 |
| 967,068 | 8/1964 | United Kingdom | 356/19 |

*Primary Examiner*—John K. Corbin
*Assistant Examiner*—Jon W. Henry
*Attorney, Agent, or Firm*—Charles E. Temko

[57] ABSTRACT

A focusing screen of a type incorporating range finder prisms in a generally centrally disposed area thereon characterized in that the prisms are of microprism type and are arranged into concentric areas, the microprism in a first area refracting light rays in a first direction along a given axis, and the microprisms in a second area refracting light rays in an opposite direction along the same axis, whereby the functions of conventional split prism and conventional microprism construction are combined. To facilitate focusing on objects having principal horizontal or vertical lines, the refracting axes are aligned at an angle relative to the horizontal and vertical axes of the screen.

3 Claims, 15 Drawing Figures

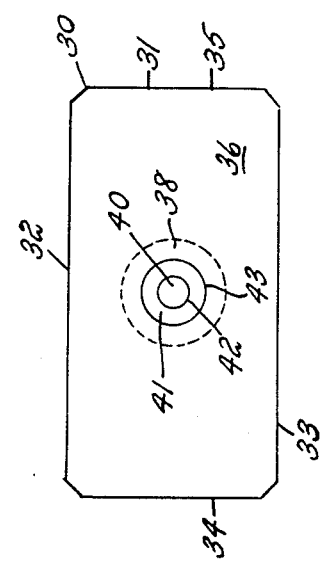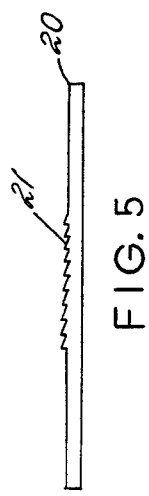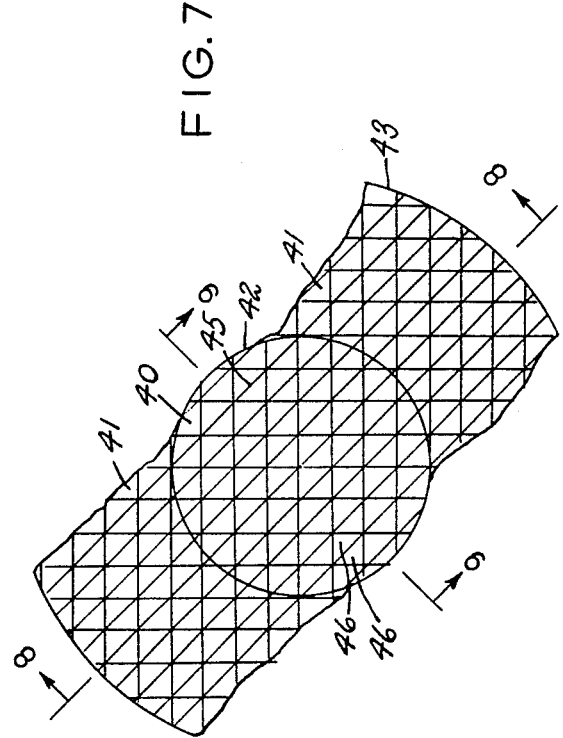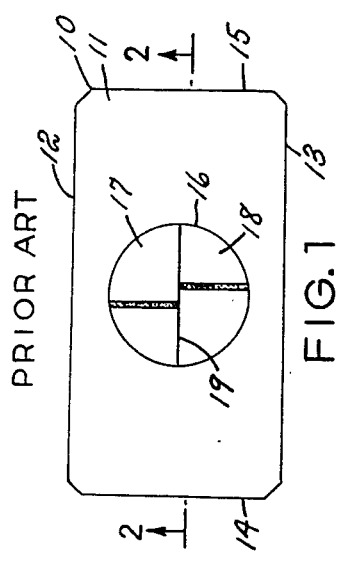

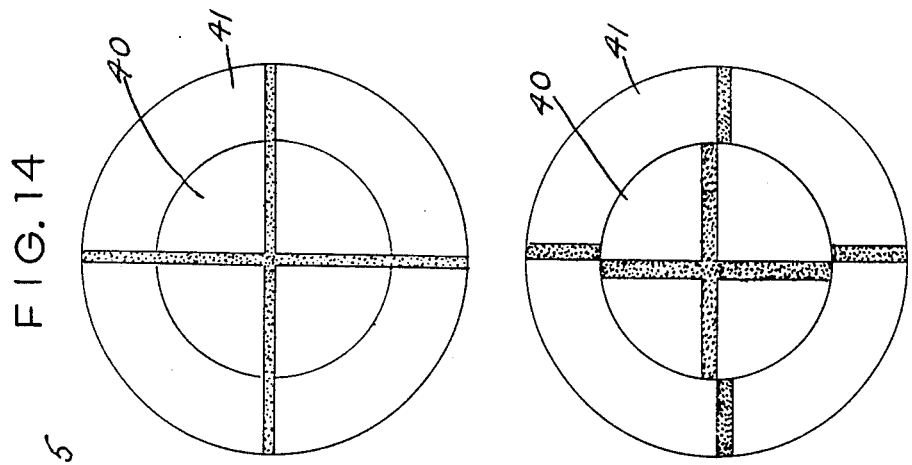
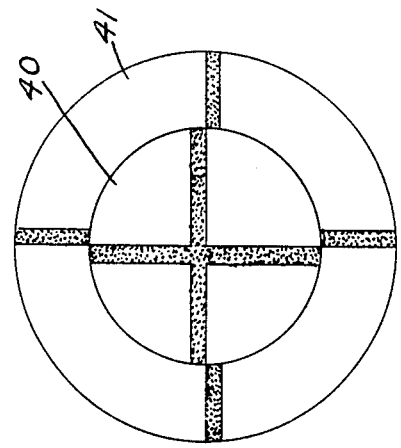
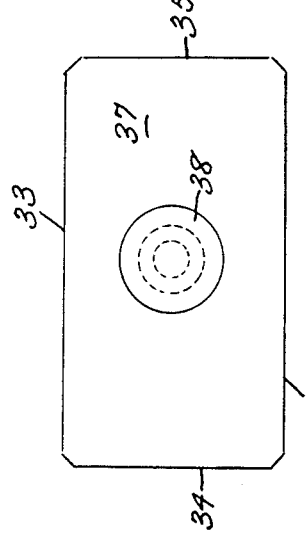
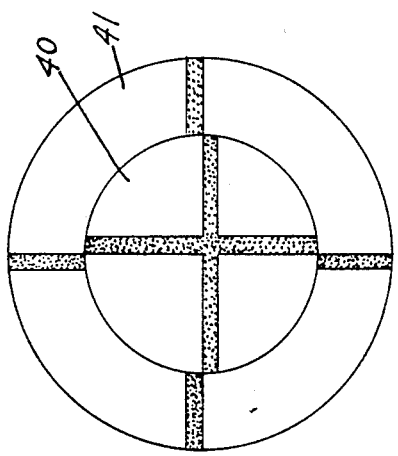
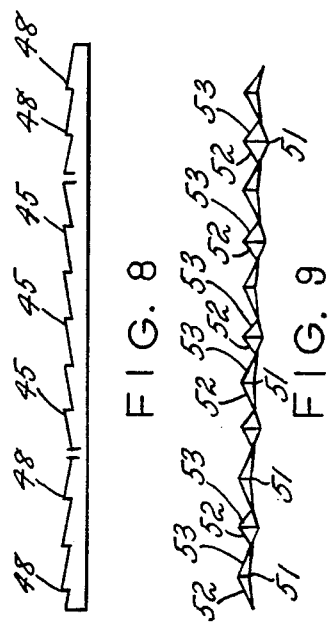
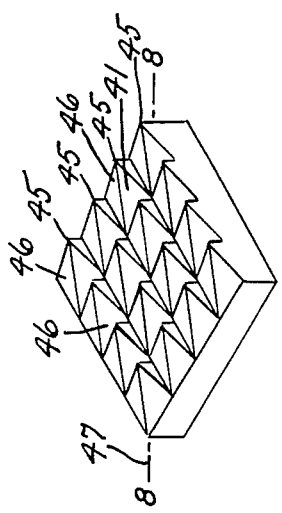
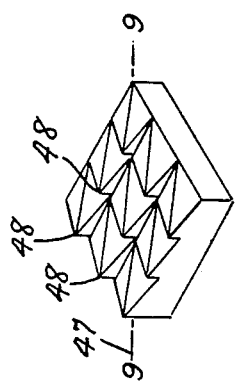

FOCUSING SCREEN FOR REFLEX CAMERAS HAVING INTEGRAL RANGE FINDER MEANS

BACKGROUND OF THE INVENTION

This invention relates generally to the field of photographic cameras, and more particularly to an improved range finder type focusing screen widely used in reflex type cameras, particularly single lens reflex types which have become increasingly popular in recent years.

Traditionally, such screens are formed of rectangular panels of glass, a lower surface of which is ground to permit the formation of a real image which may be focused. To facilitate focusing it is known to provide at a centrally disposed area, a pair of prisms with the angularly disposed planes thereof symmetrically positioned at opposite angles relative to the focusing plane to create a so-called split image which is unified when the image is in focus upon the ground glass. This construction, while useful, has a disadvantage in that depending upon the angle of the exposed prism surfaces relative to the ground glass surface, difficulty is encountered in focusing other than lenses of normal focal length, particularly when used at other than the widest aperture. In an attempt to overcome this difficulty, the prisms are sometimes supplemented by an annular area containing small microprisms which distort the viewed image when in other than correct focus. The microprism area supplements the split image prism and replaces it when using telephoto and wide angle lenses, where, because of the particular angle of incidence upon the prisms, one or the other of the prisms "blacks out". It is also known to provide a so-called Fresnel rings over selective areas of the finder to provide more even illumination.

In practice, the above constructions are not ideal. The split image prisms either with or without Fresnel type surfaces will, as mentioned above, often black out, rendering them inoperative. The microprism area does not "black out" but tends to offer very little warning to the user prior to appearance of correct focus, resulting in considerable overshooting and hunting until precise focus is obtained. It is unfortunate that the microprism area is used with lenses of relatively longer focal length, in which the depth of field is relatively short.

SUMMARY OF THE INVENTION

Briefly stated, the invention contemplates the provision in a focusing screen of the class described, of a range finder prism construction in which the above disadvantages have been eliminated by providing first and second concentric areas, each of which is provided with microprisms bending light rays along a common axis in opposite directions along said common axis. To facilitate focusing on objects having dominant horizontal or vertical lines, the common axis is positioned at 45° with respect to the vertical and horizontal axes of the screen. The visual effect combines the split image viewing of conventional prism construction and the rapid blurring of the image common to microprism construction in the same area. Since only microprisms are employed, there is no image black out irrespective of the focal length of the lens being focused, and the aperture at which focusing is made.

BRIEF DESCRIPTION OF THE DRAWINGS

In the drawings, to which reference will be made in the specification, similar reference characters have been employed to designate corresponding parts throughout the several views.

FIG. 1 is a view in elevation, somewhat schematic, of a conventional split prism range finder construction in accordance with the known art.

FIG. 2 is a sectional view, again schematic, as seen from the plane 2—2 in FIG. 1.

FIG. 3 is an elevational view of a second embodiment of the known prior art, showing the incorporation of Fresnel type ridges in the exposed surfaces of the split prisms.

FIG. 4 is a transverse sectional view as seen from the plane 4—4 in FIG. 3.

FIG. 5 is a transverse sectional view as seen from the plane 5—5 in FIG. 3.

FIG. 6 is a view in elevation of an embodiment of the invention.

FIG. 7 is an enlarged fragmentary view in elevation corresponding to the central portion of FIG. 6.

FIG. 8 is a transverse sectional view as seen from the plane 8—8 in FIG. 7.

FIG. 9 is a transverse sectional view as seen from the plane 9—9 in FIG. 7.

FIG. 10 is an enlarged fragmentary view in perspective corresponding to the central portion of FIG. 7, and showing the alignment of microprisms with respect to the plane 8—8 thereon.

FIG. 11 is a similar enlarged fragmentary view in perspective showing prisms in the area peripherally disposed relative to the microprisms shown in FIG. 10.

FIG. 12 is a view in elevation of the embodiment showing the side opposite that seen in FIG. 6.

FIG. 13 is a schematic view showing the embodiment in use with an image in out of focus position.

FIG. 14 is a similar schematic view showing the same image in proper focus.

FIG. 15 is a similar schematic view showing a second out of focus condition disposed on an opposite side of the correct focal plane relative to the position shown in FIG. 13.

DETAILED DESCRIPTION OF THE DISCLOSED EMBODIMENT

Before entering into a detailed consideration of the disclosed embodiment, a brief discussion of the prior art is considered apposite. Referring to FIG. 1, reference character 10 designates a commonly used split prism type finder constructed in accordance with the prior art. The finder includes a ground glass screen 11 bounded by a top edge 12, a bottom edge 13, and side edges 14 and 15. Bounded by an arcuate edge 16 are first and second prisms 17 and 18 and separated by a rectilinear parting line 19. As has been mentioned hereinabove, this type of construction, while quite accurate, and suitable for use with lenses of normal focal length, is not suitable for use with relatively long focal length lenses particularly those of the telephoto type, owing to the tendency for one or the other of the prisms to black out should the eye of the user be even slightly misaligned with respect to the principal axis of the finder. This is caused by the angles of convergence of light rays passing through such lenses. Since most wide angle lenses used with single lens reflex cameras are of the so-called retrofocus design, in order to provide sufficient room for movement of the reflex mirror, a similar problem exists with such lenses which are, in effect, inverted telephoto type designs.

Reference character 20 (FIG. 3) designates a modified design, in which the first and second prisms 21 and 22, respectively, are provided with Fresnel type grooves facing in opposite directions on either side of the parting line 24. This type of construction is an improvement over that shown in FIG. 1, but it is not entirely satisfactory.

Reference is now made to the embodiment of the invention, indicated by reference character 30, in which a ground glass screen 31 is bounded by a top edge 32, a bottom edge 33, as well as side edges 34 and 35. An upper surface (as positioned within the camera) 36 is smoothly polished, while a lower surface 37 is ground in conventional manner to leave a centrally disposed circular area which is unground or clear disposed immediately beneath the range finder.

Referring to FIG. 6, a circular centrally disposed area 40 is surrounded by an annular area 41, the areas 40—41 being bordered by concentric circles 42 and 43. Reference is made to FIg. 7. A first set of microprisms 45 is provided with operative faces 46 positioned on either side of an axis 47 corresponding to the plane 8—8, whereby light impinging upon the microprisms will be deflected rightwardly as seen in FIG. 10. A second set of microprisms 48 (FIG. 11) covers the annular area 41, and deflects light leftwardly as seen in FIG. 11 along the same axis 47.

FIG. 9 illustrate in greater detail the configuration of the individual microprisms, generally indicated by reference character 51. Symmetrically arranged surfaces 52 and 53 of the microprisms 45 are angled upwardly to the left and right in FIG. 9, to result in the provision of individual wedge-shaped sections of glass oriented to refract light passing therethrough in the desired direction. The theory of operation of such microprisms is, of course, known in the art, and the utilization of such prisms in the present invention differs from prior art practice in that the two areas 40 and 41 contain prisms which are aligned along a common axis, so that they may function both in the manner of a conventional split prism, and as a microprism as well.

Reference is made to FIGS. 13, 14 and 15 which illustrate images seen by a user in focusing a lens using the disclosed embodiment. In FIG. 13, a thin section cruciform image is displayed such that the portion seen in the central area 40 is misaligned with respect to the annular area 41. It will be observed that the image is not only misaligned, but blurred and thickened with respect to its actual focused appearance which is shown in FIG. 14. In FIG. 14, the split image is unified signifying correct focus, and in addition, the width of the cruciform image is proportionally correct. Should the user overshoot, he will be presented with the image shown in FIG. 15, wherein the split image is misaligned in an opposite direction along the axis 47, the image otherwise resembling, in most respects, that seen in FIG. 13. Thus, depending upon which direction the centrally disposed image is misaligned, the user can determine whether he has focused, on each occasion, either too near or too far with respect to the correct focus.

It is to be understood that it is not considered that the invention is limited to the precise details of structure shown and set forth in this specification, for obvious modifications will occur to those skilled in the art to which the invention pertains.

I claim:

1. An improved range finder type focusing screen for reflex camera comprising: a generally planar translucent member forming the body of said screen, said member having upper and lower surfaces; one of said surfaces defining a generally centrally disposed first area having a peripheral border, and a second area surrounding said first area and having a second peripheral border; said first area having a first plurality of microprisms formed on said surface, and oriented to refract light rays falling thereon along an axis substantially perpendicular to the plane of said translucent member in a first direction having a first vector component lying in said plane; said second area having a second plurality of microprisms oriented to refract light rays falling thereon along axes substantially perpendicular to said last mentioned plane in a second direction having a second vector component equal in magnitude to said first vector component and lying in said plane and extending in a direction opposite that of said first vector component; whereby portions of an out-of-focus image cast upon said first and second areas will appear mutually displaced along an axis parallel to that of said first and second vector components, and blurred to a degree depending upon the distance said portions are mutually displaced.

2. Structure in accordance with claim 1, further characterized in the other of said surfaces of said translucent member being ground to define a transparent area beneath said first and second areas.

3. Structure in accordance with claim 1, further characterized in said first and second areas having the microprisms thereon so oriented to refract said light rays in planes which are in non-parallel relation to the peripheral edges of said translucent member.

* * * * *